United States Patent
Collins et al.

(10) Patent No.: US 6,298,791 B1
(45) Date of Patent: Oct. 9, 2001

(54) LATERAL SUSPENSION ASSEMBLY FOR A GUIDED VEHICLE SYSTEM

(75) Inventors: David C. Collins, Burlington; Albert E. Lewis, Mattapan; Gerald A. Garneau, Jr., Hudson, all of MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/438,176

(22) Filed: Nov. 11, 1999

(51) Int. Cl.$^7$ ........................................................ B61F 9/00
(52) U.S. Cl. .............................................................. 104/243
(58) Field of Search ........................... 104/119, 139, 104/140, 242, 243, 245, 247; 105/72.2, 215.1

(56) References Cited

U.S. PATENT DOCUMENTS

| | | |
|---|---|---|
| 989,958 | 4/1911 | Frahm . |
| 2,016,207 | 10/1935 | Lindenberg . |
| 2,503,120 | 4/1950 | Meyer . |
| 2,744,749 | 5/1956 | Fiedor . |
| 2,887,071 | 5/1959 | Settles . |
| 2,901,239 | 8/1959 | Sethna . |
| 3,673,966 | 7/1972 | Wilson . |
| 3,675,583 * | 7/1972 | Sobey et al. .................... 104/243 |
| 3,788,233 | 1/1974 | Colovas et al. . |
| 3,811,383 | 5/1974 | Butzow . |
| 3,814,025 | 6/1974 | Nelson . |
| 3,831,527 | 8/1974 | Peterson . |
| 3,881,427 | 5/1975 | Blume . |
| 3,913,491 | 10/1975 | Auer et al. . |
| 3,977,487 * | 8/1976 | Katayose et al. .................... 104/247 |
| 4,092,930 * | 6/1978 | Takemura et al. .................... 104/247 |
| 4,183,304 | 1/1980 | Forster . |
| 4,223,611 | 9/1980 | Dawson et al. . |
| 4,259,810 | 4/1981 | West . |
| 4,265,180 | 5/1981 | Uozumi . |
| 4,267,779 * | 5/1981 | Binder .................................. 104/247 |
| 4,436,170 * | 3/1984 | Mehren et al. ........................ 104/247 |
| 4,522,128 | 6/1985 | Anderson . |
| 4,644,692 | 2/1987 | Schindehutte . |
| 4,671,185 | 6/1987 | Anderson et al. . |
| 4,708,695 | 11/1987 | Sugiyama . |
| 4,765,648 | 8/1988 | Mander et al. . |
| 4,798,254 | 1/1989 | Lings . |

(List continued on next page.)

FOREIGN PATENT DOCUMENTS

| | | |
|---|---|---|
| 1 161 936 | 1/1964 | (DE) . |
| 14 05 857 A | 6/1970 | (DE) . |
| 34 13 224 A | 11/1985 | (DE) . |
| 40 32 378 | 4/1992 | (DE) . |
| 43 01 986 A | 7/1994 | (DE) . |
| 198 28 393 A1 | 7/1999 | (DE) . |
| 88 241 A | 9/1983 | (EP) . |
| 88 241 B1 | 9/1983 | (EP) . |
| 464 720 A1 | 1/1992 | (EP) . |
| 625 815 A2 | 11/1994 | (EP) . |
| 747 281 A2 | 12/1996 | (EP) . |
| 747 281 A3 | 8/1997 | (EP) . |
| 605894 | 6/1926 | (FR) . |
| 2 652 375 | 3/1991 | (FR) . |
| 1 118 853 A | 7/1968 | (GB) . |
| WO98 46467 | 10/1998 | (SE) . |

*Primary Examiner*—Mark T. Le
(74) *Attorney, Agent, or Firm*—Iandiorio & Teska

(57) ABSTRACT

A lateral suspension assembly for a guided vehicle system includes a pair of lateral wheel housings each including a lateral wheel rotatable about spaced vertical axes for engaging spaced opposing guide rails of the guided system; a lateral limit link for limiting outward travel of the lateral wheels beyond a predetermined limit; a pair of spaced support arms pivotably attached at one end to the guided vehicle and at the other to the lateral wheel housings; and a biasing device interconnected with each of the wheel housings for urging the lateral wheels in contact with the guide rails.

8 Claims, 4 Drawing Sheets

U.S. PATENT DOCUMENTS

| | | |
|---|---|---|
| 4,803,804 | 2/1989 | Bryant . |
| 4,953,472 | 9/1990 | Tutzer . |
| 4,960,290 | 10/1990 | Bose . |
| 5,067,608 | 11/1991 | McLellan . |
| 5,094,312 | 3/1992 | Hakel . |
| 5,148,631 | 9/1992 | Bayard et al. . |
| 5,277,124 | 1/1994 | DiFonso et al. . |
| 5,431,261 | 7/1995 | Olgac . |
| 5,443,282 | 8/1995 | Gipser . |
| 5,551,190 | 9/1996 | Yamagishi et al. . |
| 5,558,191 | 9/1996 | Lai . |
| 5,755,059 | 5/1998 | Schap . |
| 5,832,665 | 11/1998 | Miller et al. . |
| 5,845,581 | 12/1998 | Svensson . |
| 5,848,663 | 12/1998 | Kuriki . |
| 5,906,071 | 5/1999 | Buchanan, Jr. . |
| 5,921,026 | 7/1999 | Miller . |
| 5,979,114 | 11/1999 | Clark et al. . |
| 6,009,671 | 1/2000 | Sasaki . |
| 6,120,401 | 9/2000 | Wilken . |

\* cited by examiner

US 6,298,791 B1

LATERAL SUSPENSION ASSEMBLY FOR A GUIDED VEHICLE SYSTEM

FIELD OF INVENTION

This invention relates to a lateral suspension assembly for a guided vehicle system.

BACKGROUND OF INVENTION

Conventional laterally guided vehicles rely on lateral guide rails to stabilize and direct them along the guideway. In one approach this is done with lateral rollers that engage the lateral rails and continuously hunt from side to side resulting in lateral bounce and uncomfortable "head toss". This occurs because the lateral rollers on each side are fixed together in a four bar linkage so that any bump in a guide rail will be translated from the associated lateral guide roller to the entire mechanism and steer the castered support tires to move the vehicle in the other direction from the bump. Thus the vehicle is urged toward the other guide rail. As a result the vehicle swings from side to side causing noise, head toss and other passenger discomfort and wear and damage to the vehicle. In another approach, in order to avoid the head-toss problem the support tires are constantly steered toward one or the other of the guide rails causing scrubbing of the tires and premature wear. In addition, the force of friction between the tires and their footprint on the guideway is a significant distance from the center of gravity of the vehicle, causing annoying and dangerous roll forces on the passenger and vehicle. In such approaches the wide range and unpredictability of movement of the guide wheels and the vehicle as a whole require wider guideways and greater tolerances for power collection and communications and makes the lateral wheels' motion unreliable as an indicator of vehicle distance and position.

SUMMARY OF INVENTION

It is therefore an object of this invention to provide an improved lateral suspension assembly for a guided vehicle system.

It is a further object of this invention to provide such a lateral suspension assembly which reduces head-toss and roll and provides improved guidance and lateral stability.

It is a further object of this invention to provide such a lateral suspension assembly which avoids hunting and bounce and maintains a constant contact between the lateral wheels and guide rails despite wind loads and guide rail deviations.

It is a further object of this invention to provide such a lateral suspension assembly which reduces necessary guideway width and tolerances for power collection and communication antennas.

It is a further object of this invention to provide such a lateral suspension assembly which enables guide wheels to be used as indicators of distance and position.

The invention results from the realization that a truly safe, stable and comfortable guided vehicle can be achieved using a lateral suspension assembly that employs a pair of spaced lateral wheels which are biased to independently maintain constant contact with their respective guide rails.

This invention features a lateral suspension assembly for a guided vehicle system including a pair of lateral wheel housings each including a lateral wheel rotatable about spaced vertical axes for engaging spaced opposing guide rails of the guided system. A lateral limit link limits outward travel of the lateral wheels beyond a predetermined limit. There is a pair of spaced support arms pivotably attached at one end to the guided vehicle and at the other to the lateral wheel housings. A biasing device interconnected with each of the wheel housings urges the lateral wheels in contact with the guide rails.

In a preferred embodiment the lateral link limit may include a first shaft connected to one of the wheel housings, a second shaft connected to the other wheel housing, and a stop for limiting outward translation of the shafts relative to each other. Each support arm may include a pair of vertically spaced pivots attached to the guided vehicle and a pivot attached to one of the wheel housings. The biasing device may include a pair of biasing members one interconnected between each wheel housing and the guided vehicle. The biasing device may also include a damper associated with each biasing member. The lateral wheels may be generally vertically aligned with the center of gravity of the vehicle. At least one of the lateral wheel housings may include an encoder for monitoring the rotation of the associated lateral wheel. The biasing device may urge the lateral wheels outwardly in contact with the guide rails.

DISCLOSURE OF PREFERRED EMBODIMENT

Other objects, features and advantages will occur to those skilled in the art from the following description of a preferred embodiment and the accompanying drawings, in which.

Figure 1:
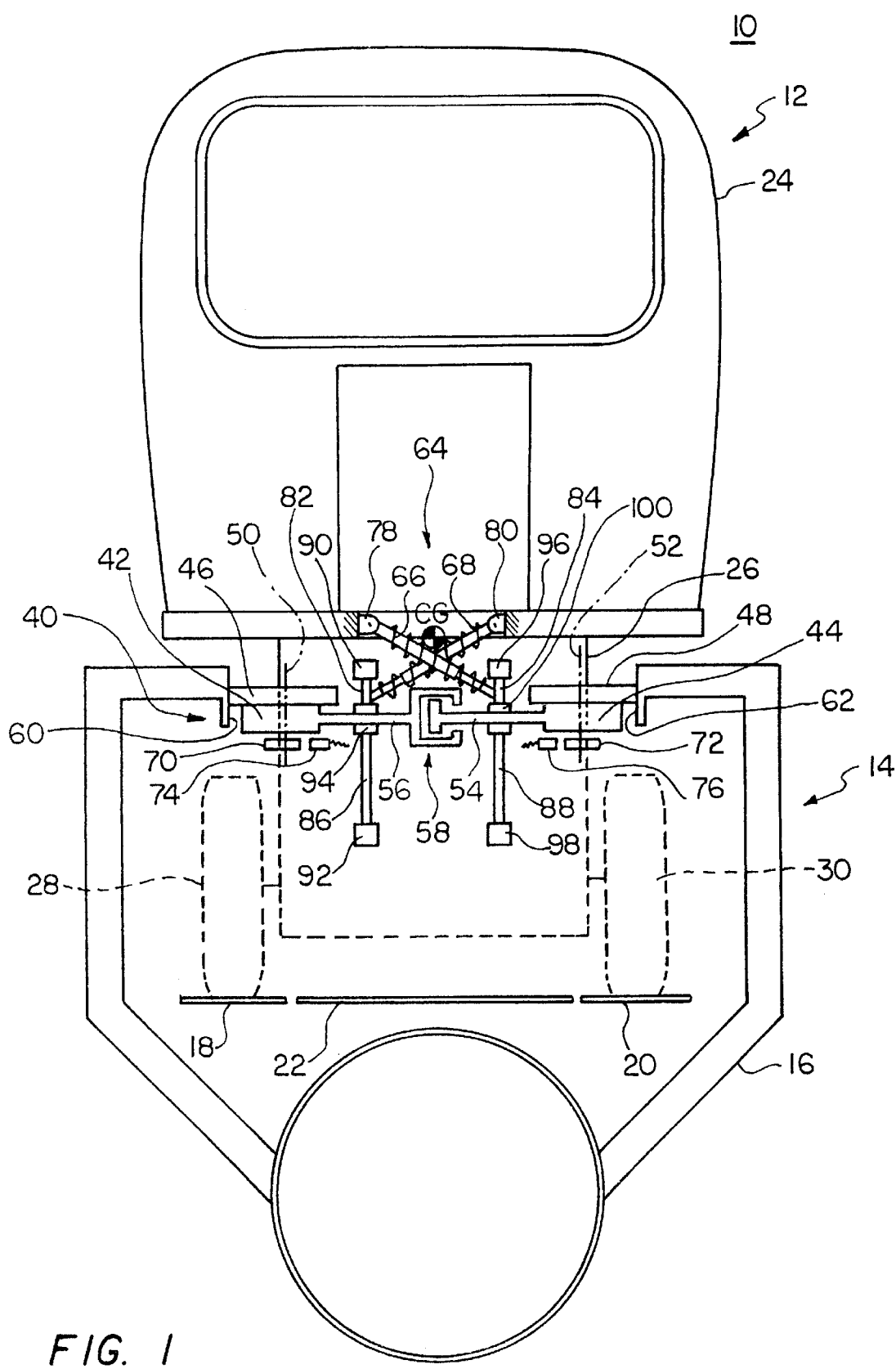
FIG. 1 is a schematic end view of a guided vehicle and guideway of a guided vehicle system using a lateral suspension assembly according to this invention.

There is shown in FIG. 1 a guided vehicle system 10 including a vehicle 12 which moves on guideway 14. Guideway 14 includes a support structure 16 including main running surfaces 18 and 20 and a walkway or grate 22. Guided vehicle 12 includes cabin 24 mounted on chassis 26 which rolls on four main support tires only two of which, 28 and 30, are shown supported on running surfaces 18 and 20. Mounted on chassis 26 is a lateral suspension assembly 40 according to this invention which includes lateral wheel housings 42 and 44, each of which includes a lateral wheel 46 and 48 rotatable about spaced vertical axes 50 and 52 and generally aligned with the center of gravity CG of the vehicle. Assembly 40 can be better understood by reference to the more detailed illustration of FIG. 2 in conjunction with FIG. 1. Wheel housings 42 and 44 also include inner shaft 54 and outer shaft 56 which interact by means of stop 58 to function as a lateral limit link to prevent the wheels 46 and 48 from extending outwardly beyond a predetermined limit even when lateral guide rails 60, 62 may diverge or one of them may be absent when, for example, the guided vehicle 12 comes to a point in the guideway 14 where it is compelled to switch tracks at a merging or diverging intersection.

A biasing device 64 may include a pair of springs 66 and 68 for constantly urging lateral wheels 46 and 48 outwardly against lateral guide rails 60 and 62. (In other constructions the springs may be arranged to provide an inward bias.) This constant contact force ensures that the guided vehicle 12 remains generally centered and does not bounce or hunt about the guideway 14. This prevents head-toss and other discomforts for the passenger and enables the guideway to be made narrower and more compact. It also enables the vehicle to be properly laterally aligned with the station platform to control the gap between the vehicle and station platform and insure passenger safety during loading and unloading. (In other constructions the springs may be arranged to provide an inward bias.) Guide wheels 46 and 48 may be made of suitable materials such as polyurethane. Because guide wheels 46 and 48, or at least one of them, is in constant contact with a lateral guide rail 60, 62, one or both of them may be equipped with an encoder 70, 72 and sensor 74, 76 so that the travel distance and position of the guided vehicle 12 can always be accurately determined.

Springs 66 and 68 typically have one end attached by means of a clevis 78, 80 to chassis 26 and the other end attached by devises 82 and 84 to support arms 86 and 88. The support arms may be a single shaft which is pivoted to the chassis at one end and to each lateral wheel housing at the other, or, as preferred and shown in FIG. 2, they may have a triangular or A shape and be connected at two points to chassis 26 and at one point to each of lateral wheel housings 42 and 44. For example, A arm 86 is attached to chassis 26 at clevises 90 and 92 and to wheel housing 42 at clevis 94. A arm 88 is mounted to chassis 26 at devises 96 and 98 and to wheel housing 44 at clevis 100 as can be more clearly seen in FIG. 3.

Figure 2:
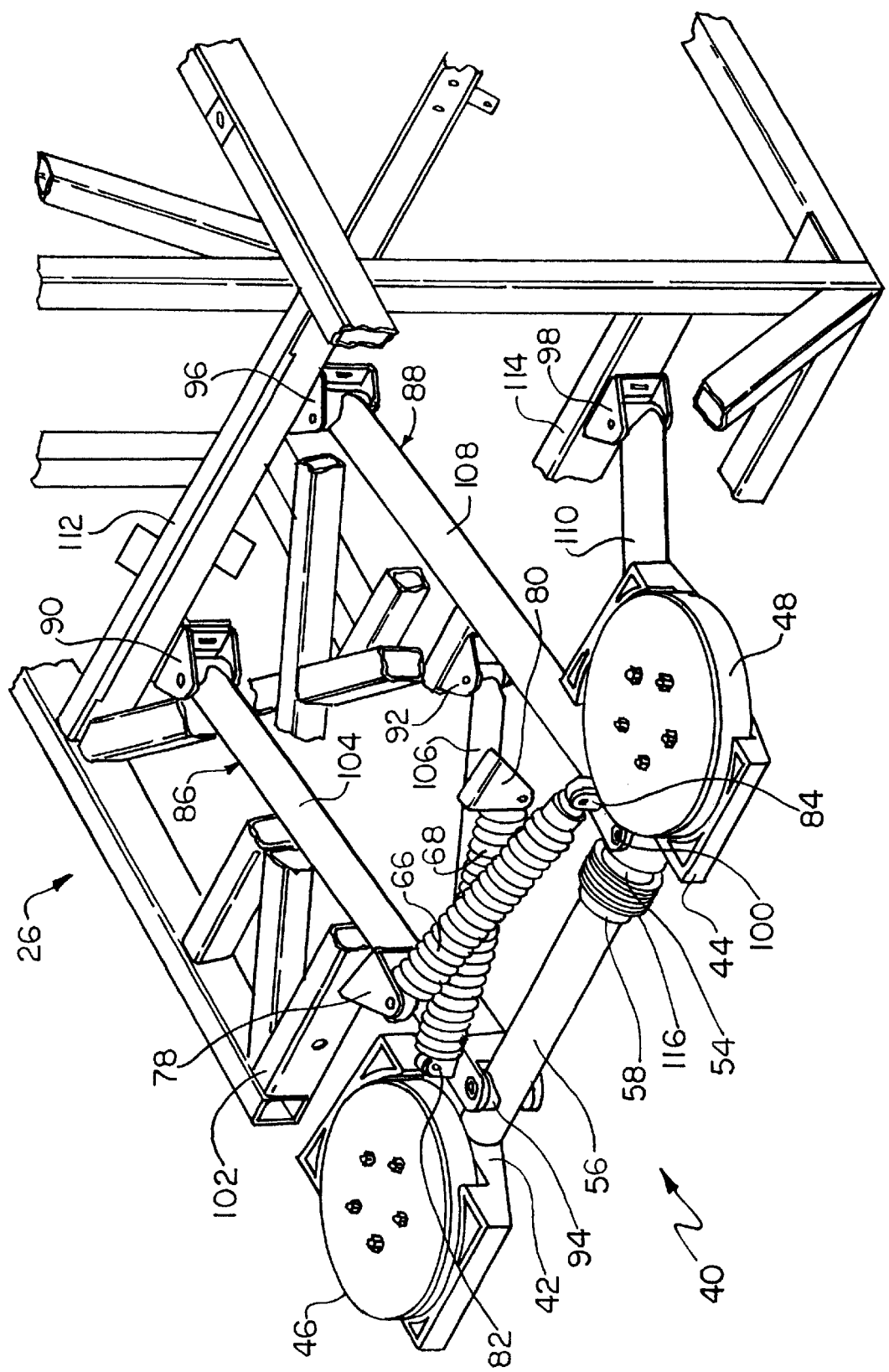
FIG. 2 is a three-dimensional diagrammatic view of the lateral suspension assembly of FIG. 1 and the vehicle chassis frame.

As can be seen in more detail in FIG. 2, chassis 26 is made up of a number of tubular members of rectangular cross section. Clevises 78 and 80 which mount springs 66 and 68 to chassis 26 are interconnected with frame member 102. At their other ends springs 66 and 68 are attached at devises 82 and 84 to the support arms 86 and 88. The triangular or A shape arms 86 and 88 each include two rails 104, 106 and 108 and 110. The upper rails interconnect through their devises 90 and 96 to chassis 26 at frame member 112 while the lower devises 92 and 98 attach to frame member 114. Stop member 58 is axially enclosed in the bellows 116 to protect the sliding shafts from contaminants and weather.

Figure 3:
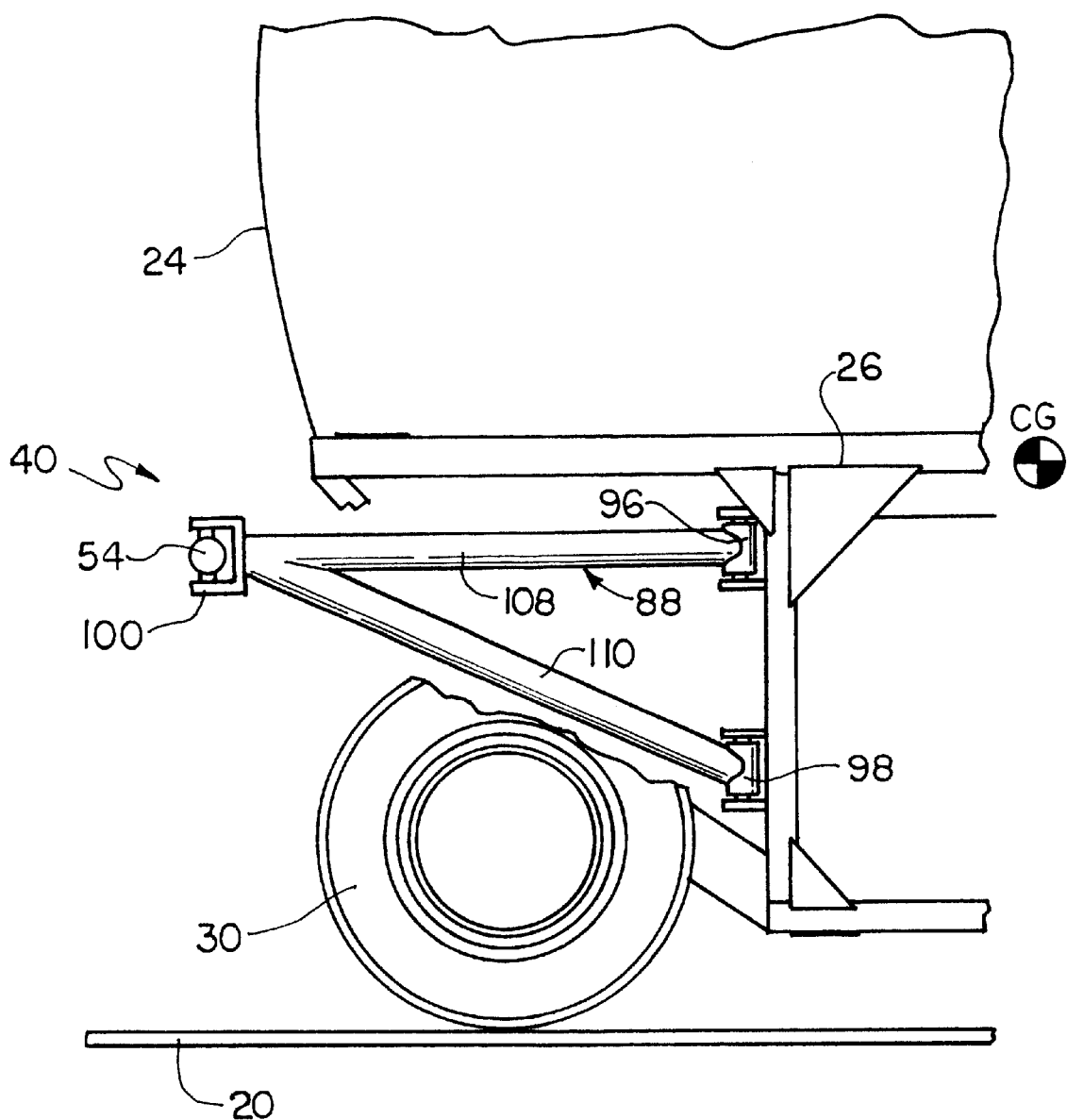
FIG. 3 is a schematic side view of one end of the guided vehicle showing the support arms and other portions of the lateral suspension assembly of FIG. 2.

The triangular or A shape of support arms 86 and 88 can be better seen in FIG. 3 where a number of parts have been removed in order to more clearly show the profile of A arm 88.

Figure 4:
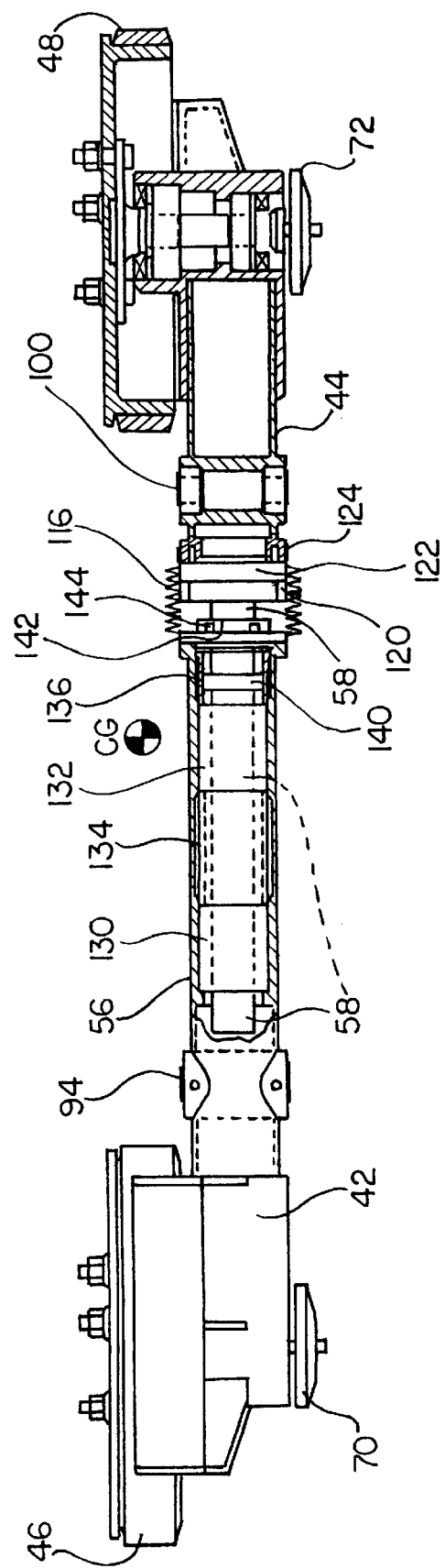
FIG. 4 is a front elevational sectional view of the lateral wheel housings, lateral wheels and lateral limit link of FIG. 2.

In one preferred embodiment the lateral limit link may be constructed as shown in FIG. 4 where shaft 58, the inner shaft, is mounted as a part of housing 44 using flange 120, shim 122 and shim 124, and outer shaft 56 is mounted to housing 42 and provides bearings 130 and 132 positioned by spacers 134 and 136 to slidingly engage the inner shaft 58. A stop 140 fixed to inner shaft 58 comes in contact with a bumper 144 and end cap assembly 142 to limit the outward travel of the two shafts and thus housings 42, 44 and their associated lateral wheels 46 and 48.

Although specific features of this invention are shown in some drawings and not others, this is for convenience only as each feature may be combined with any or all of the other features in accordance with the invention.

Other embodiments will occur to those skilled in the art and are within the following claims:

1. A lateral suspension assembly for a guided vehicle system comprising:
    a pair of lateral wheel housings each including a lateral wheel rotatable about spaced vertical axes for engaging spaced opposing guide rails of the guided system;
    a lateral limit link connected between said housings for limiting outward travel of said lateral wheels beyond a predetermined limit;
    a pair of spaced support arms pivotably attached at one end to the guided vehicle and at the other to said lateral wheel housings; and
    a biasing device interconnected with each of said wheel housings for urging said lateral wheels in contact with said guide rails.

2. The lateral suspension assembly of claim 1 in which said lateral limit link includes a first shaft connected to one of said wheel housings, a second shaft connected to the other wheel housing and a stop for limiting outward translation of said shafts relative to each other.

3. The lateral suspension assembly of claim 1 in which said biasing device includes a pair of biasing members one interconnected between each said wheel housing and the guided vehicle.

4. The lateral suspension assembly of claim 3 in which said biasing device includes a damper associated with each biasing member.

5. The lateral suspension assembly of claim 1 in which said lateral wheels are generally vertically aligned with the center of gravity of the vehicle.

6. The lateral suspension assembly of claim 1 in which said biasing device urges said lateral wheels outwardly in contact with said guide rails.

7. A lateral suspension assembly for a guided vehicle system comprising:
    a pair of lateral wheel housings each including a lateral wheel rotatable about spaced vertical axis for engaging spaced opposing guide rails of the guided system;
    a lateral limit link connected between said housings for limiting outward travel of said lateral wheels beyond a predetermined limit;
    a pair of spaced support arms pivotably attached at one end to the guided vehicle and at the other end at said lateral wheel housings, each said support arm including a pair of vertically spaced pivots attached to said guided vehicle and a pivot attached to one of said wheel housings; and
    a biasing device interconnected with each of said wheel housings for urging said lateral wheels in contact with said guide rails.

8. A lateral suspension assembly for a guided vehicle system comprising:
    a pair of lateral wheel housings each including a lateral wheel rotatable about a spaced vertical axis for engaging spaced opposing guided rails of the guide system, at least one of said lateral wheel housings including an encoder for monitoring this rotation of the associated said lateral wheel;
    a lateral limit link connected between said housings for limiting outward travel of said lateral wheels beyond a predetermined limit;
    a pair of spaced support arms pivotably attached at one end to the guided vehicle and at the other end to said lateral wheel housings; and
    a biasing device interconnected with each of said wheel housings for urging said lateral wheels in contact with said guide rails.

\* \* \* \* \*